United States Patent [19]

Davis

[11] 4,432,571
[45] Feb. 21, 1984

[54] RETAINER GLAND FOR MECHANICAL JOINT PIPE

[76] Inventor: Samuel H. Davis, 111 Forest Dr., Jericho, N.Y. 11753

[21] Appl. No.: 279,307

[22] Filed: Jul. 1, 1981

[51] Int. Cl.³ .................... F16L 27/00; F16L 25/00; F16L 21/00; F16L 27/04
[52] U.S. Cl. .................................. 285/283; 285/420; 285/232; 285/235; 285/264
[58] Field of Search ............... 285/420, 283, 231, 232, 285/235, 264

[56] References Cited

U.S. PATENT DOCUMENTS

| 533,761 | 2/1895 | Walker et al. | 285/283 |
| 1,812,678 | 6/1931 | Bernert | 285/420 X |
| 4,076,281 | 2/1978 | Davis | 285/64 |

OTHER PUBLICATIONS

American Pipe Manual, 15th Ed., 1979; American Cast Iron Pipe Company, Birmingham, Ala.
Pipe Economy, No. 75, 1975; Clow Corporation, Bensenville, Ill.
Catalog 1978B, Davis Bell-Stop Wall Casting Assemblies; Davis Piping Specialties, Inc., Jericho, NY.
U.S. Pipe Restrained Joints, 1978 Ed.; United States Pipe & Foundry Company, Birmingham, Ala.
U.S. Pipe New 42" & 48" Usiflex Flexible Joint Pipe, U.S. Pipe & Foundry Co.

Primary Examiner—Richard J. Scanlan, Jr.
Attorney, Agent, or Firm—Kenyon & Kenyon

[57] ABSTRACT

A retainer gland and gland assembly for mechanical joint pipe. The retainer gland has at least one hinge arm extending axially from a side of a flat ring flange portion on the opposite side of the flange ring from a circular rib gland portion. The hinge arm has a transverse hole through its outer end. The gland assembly includes two identical retainer glands encircling a spacer pipe the ends of which are inserted into opposed mechanical joint bells. The flange ring of each retainer gland is bolted to the flange of the respective mechanical joint bell, and the hinge arms of the two glands are pivotally connected by a hinge bolt passing through the transverse holes. The resulting restrained mechanical joint connection not only permits assembly of angularly misaligned pipes, up to the limits allowed by the standard mechanical joint bells, but also accommodates changes in angular alignment after installation, due to settling.

11 Claims, 6 Drawing Figures

RETAINER GLAND FOR MECHANICAL JOINT PIPE

BACKGROUND OF THE INVENTION

1. Technical Field

This invention relates to restrained connections for flexible joint pipe and particularly to a restrained connection for mechanical joint pipe.

2. Background Art

Gray iron and ductile iron pipes in nominal sizes ranging from 2 inches to 48 inches are extensively used in systems handling water and other liquids at pressure ratings from 150 to 350 pounds per square inch. Conventional connections for such pipes are of three general types: bell-and-spigot (or slip-on), flanged, and mechanical joint.

A bell-and-spigot connection is the simplest and least expensive; it is made up by inserting a plain end of one pipe into a bell end of another pipe or fitting. The joint is traditionally sealed by lead calking, but in recent years rubber gaskets have become more popular.

In a flanged connection, each end of a pipe or fitting has an integrally cast or a threaded-on flat-faced flange, and the joint is made up by bolting together the flanges of two abutting pipes, or a pipe and a fitting, with a flat rubber gasket between the flange faces.

A mechanical joint is a bolted joint of the stuffing box type and comprises three elements—a flanged bell, a rubber sealing gasket, and a compression ring or gland. The bell may be cast as an integral part of one end of a standard length of pipe or a fitting (e.g., a tee, elbow, etc.), or it may be cast as a separate unit and threaded for assembly onto a threaded end of a pipe, in the same manner as a threaded flange. The bell end of one pipe section accepts a plain end of another pipe section of the same nominal size, after first slipping a flanged gland and a rubber gasket over the plain end. The gasket fits inside the bell and is maintained in compression by bolting the flange of the gland to the flange of the bell.

A principal advantage of bolted flange connections is that the bolts prevent axial separation of the joint; however, such a connection will not accommodate any angular misalignment. Both bell-and-spigot and mechanical joint connections, on the contrary, can tolerate varying degrees of angular misalignment, depending on the pipe diameter, but friction of the gasket provides the only restraint against separation of the joint. Although the compression exerted by the gland of a mechanical joint connection increases the frictional resistance, as well as improving the sealing effectiveness, of this type of joint as compared with a rubber-gasketed bell-and-spigot connection, massive concrete foundations or other restraining means are required to prevent separation by internal pressure at locations where a pipeline changes direction.

Various types of locking devices are available for restraining slip-on or mechanical joint connections, but these devices either convert the joint into a rigid connection, thereby losing the angular flexibility which is the principal advantage of such connections, or the devices require a substantial amount of precision machining, which greatly increases their cost.

Examples of locking devices are shown in the American Pipe Manual, Fifteenth Edition, 1979, published by American Cast Iron Pipe Company, Birmingham, Ala., and include retainer rings welded to the outside of a plain end pipe to prevent the pipe from slipping through a gland ring bolted to a flanged mating bell end pipe or fitting (pages 9-2 to 9-6), setscrews threaded radially through a mechanical joint gland into the outside of plain end pipe (pages 9-10 to 9-12), and setscrews threaded through a plain end pipe from inside and engaging a groove machined inside a mating slip-on bell (pages 9-15 to 9-16). Double-ended adapter glands are also available, for mating assembly between opposed bell ends of mechanical joint pipe (page 9-7. See also Clow Corporation catalog "Pipe Economy," published 1975, at pages 85-92). These restraining devices permit pipe to be laid with initial angular deflections, but do not accommodate subsequent deflections due to settling after installation. To retain flexibility after assembly, it is necessary to use ball joint pipe (pages 10-1 to 10-21 of American catalog or pages 55-59 of Clow catalog). Ball joint pipe is expensive, however, because the surfaces of the ball and mating socket must be accurately machined.

SUMMARY OF THE INVENTION

It is a principal object of the present invention, therefore, to provide a flexible restrained mechanical joint connection which not only permits angular misalignment at the time of initial assembly but also accommodates movement of the joint after assembly, due to settling.

Another object of the invention is to provide a restrained mechanical joint connection which is inexpensive to manufacture and easy to assemble in the field.

Still another object of the invention is to provide a restrained mechanical joint connection which does not require modification of either the plain end or the bell end of the pipes or fittings being joined.

Another object of the invention is to provide a restrained mechanical joint connection which has a minimum number of parts in addition to those required for a standard mechanical joint connection.

These and other objects are achieved by use of a retainer gland for mechanical joint pipe and mechanical joint fittings, the gland including a flat ring portion having two substantially parallel faces and a circular inner circumference, and a circular rib portion extending generally axially from one face of the flat ring portion adjacent said inner circumference, the flat ring portion and the circular rib portion having a generally L-shaped radial cross section, wherein the retainer gland further comprises at least a first hinge arm extending generally axially from the other face of the flat ring portion and terminating in an outer end portion, the hinge arm having a transverse hole through said outer end portion.

Preferably, the transverse hole through the outer end portion of the hinge arm has a longitudinal axis which is substantially perpendicular to a diametral plane of the flat ring portion, and said first hinge arm is located on one side of and closely adjacent to said diametral plane. In addition, the retainer gland preferably further comprises a second hinge arm substantially congruent with said first hinge arm and having a transverse hole coaxial with the transverse hole in the first hinge arm, said second hinge arm extending from said other face of the flat ring portion in spaced relation to the first hinge arm on the other side of said diametral plane, the spacing between the first and second hinge arms being slightly greater than the transverse thickness of the first hinge arm, and a third hinge arm substantially congruent with the first and second hinge arms and having a transverse hole coaxial with the transverse holes in the first and second hinge arms, said third hinge arm extending from said other face of the flat ring portion in spaced relation to the first hinge arm and on the same side of said diametral plane, the spacing between the first and third hinge arms being slightly greater than the transverse thickness of the second hinge arm, and said transverse holes in the first, second, and third hinge arms being elongated in a direction substantially perpendicular to the faces of the flat ring portion.

The restrained mechanical joint connection of the invention comprises an assembly of a first retainer gland, as defined above, and a second retainer gland substantially identical to the first gland. The second retainer gland is arranged with its flat ring portion substantially coaxial with and spaced from the flat ring portion of the first gland member and with its first hinge arm in lapped abutment with the first hinge arm of the first gland member, and a hinge bolt extends through the transverse holes in the hinge arms of the first and second gland members.

The retainer gland assembly is adapted to be installed on a spacer pipe having plain ends which are inserted into mating mechanical joint bell ends of adjacent pipes and/or fittings, the flat ring portion of each retainer gland being clamped to the respective mechanical joint bell by flange bolts in the conventional manner to compress a rubber gasket encircling the spacer pipe inside the bell.

These and other features and advantages of the invention are discussed in detail in the following description of the preferred embodiment, as shown in the accompanying drawings.

DETAILED DESCRIPTION OF THE PREFERRED EMBODIMENT

Figure 1:
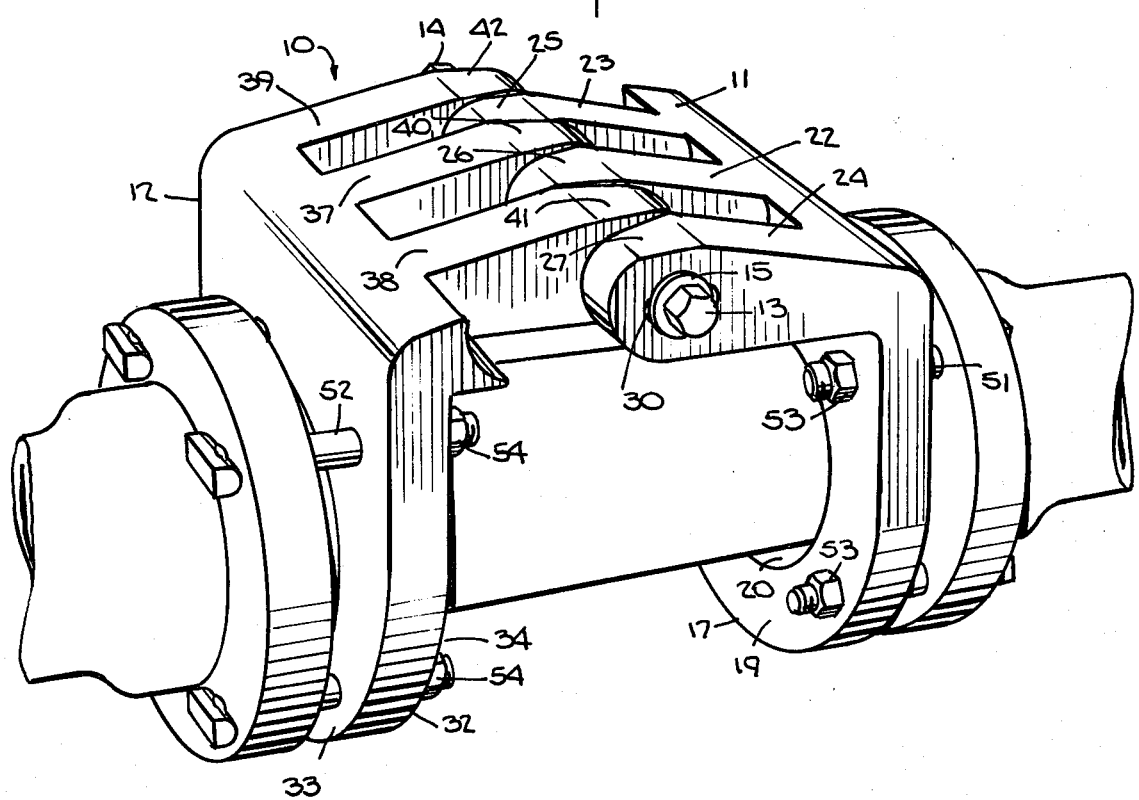
FIG. 1 is a perspective view of a restrained mechanical joint connection assembly applied to adjacent ends of two pipes in tandem.
Figure 2:
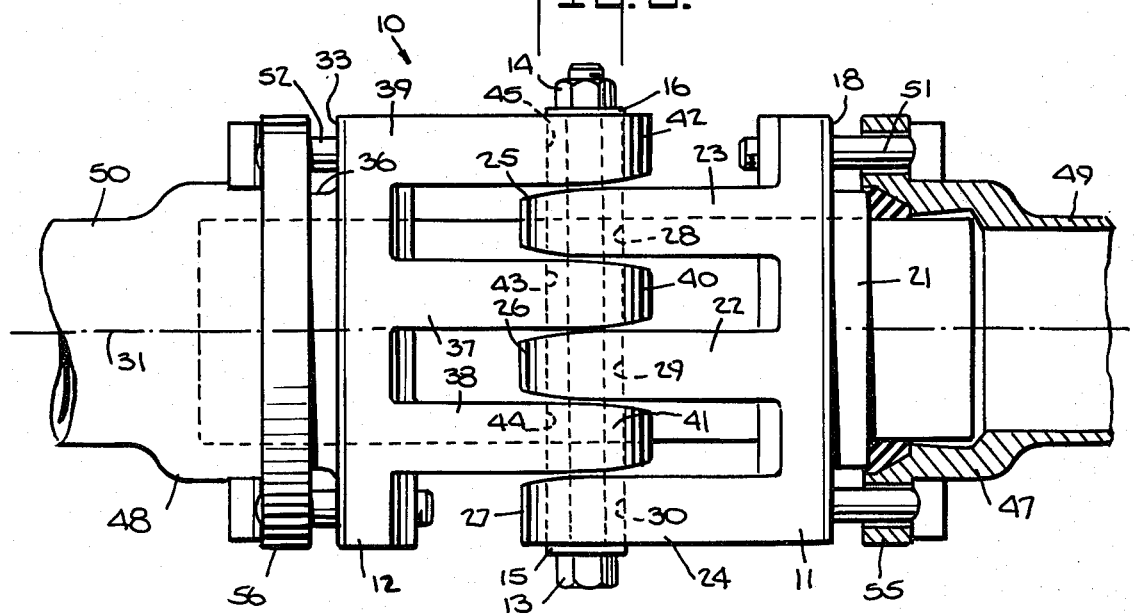
FIG. 2 is a plan view, partly in section, of the restrained mechanical joint connection of FIG. 1.

FIGS. 1 and 2 show a restrained mechanical joint pipe connection which incorporates a retainer gland assembly 10 according to the present invention, the gland assembly comprising a first retainer gland 11 and a second retainer gland 12 coupled together by a hinge bolt 13 and associated nut 14 and washers 15 and 16.

The first retainer gland 11 has a flat ring portion 17 with two substantially parallel faces 18 and 19 and a circular inner circumference 20. A circular rib portion 21 extends generally axially from the face 18 adjacent the inner circumference of the ring, and first, second, and third hinge arms 22, 23, and 24, respectively, extend in spaced apart relation generally axially from the other face 19 of the flat ring portion. The hinge arms terminate in outer end portions 25, 26, and 27 through which extend transverse holes 28, 29, and 30, respectively, for accommodating the hinge bolt 13. These transverse holes are elongated in the axial direction (see FIG. 6) to provide a substantial amount of play for the hinge bolt in that direction.

As is apparent from FIG. 2, a longitudinal axis of each hinge arm is substantially perpendicular to each face of the flat ring portion 17, and the first hinge arm 22 is located on one side of and closely adjacent to a vertical plane (denoted by dash-dot line 31) which diametrally intersects the flat ring portion of the first retainer gland. Also apparent from FIG. 2 is the fact that the spacing between the first hinge arm 22 and the second hinge arm 23 is slightly greater than the transverse thickness of the first arm, and that the spacing between the first arm and the third arm 24 is slightly greater than the transverse thickness of the second hinge arm 23.

This offset arrangement and spacing of the hinge arms permits the use of essentially identical units for the first and second retainer glands. The second retainer gland 12 also has a flat ring portion 32 with parallel faces 33 and 34 and a circular inner circumference 35 (see FIGS. 4–6). A circular rib portion 36 extends from one face 33, and first, second, and third hinge arms 37, 38, and 39, respectively, extend from the other face 34 to terminate in outer portions 40, 41, and 42 having respective elongated transverse holes 43, 44, and 45. Thus, the first hinge arm 37 of the second retainer gland laps the first hinge arm 22 of the first retainer gland and is able to slide loosely between the first and second hinge arms of the first gland. Similarly, the second hinge arm 38 of the second gland is able to slide loosely between the first and third hinge arms of the first retainer gland, and the hinge bolt 13 passes loosely through the transverse holes of all of the hinge arms.

The above-described retainer gland assembly forms a restrained mechanical joint connection when incorporated with a sapcer pipe 46 inserted into mechanical joint bell ends 47 and 48 of pipes or fittings 49 and 50, respectively, and flat ring portions 17 and 32 are clamped by means of T-head bolts 51 and 52 and nuts 53 and 54 to the respective flanges 55 and 56 of the mechanical joint bells 47 and 48.

Figure 3:
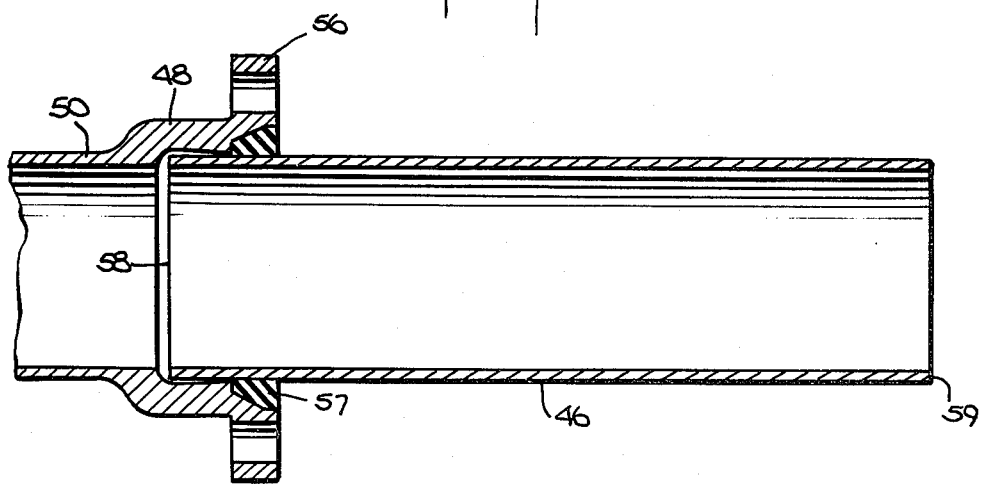
FIGS. 3 to 6 are elevation views in section of successive stages in the assembly of a restrained mechanical joint connection according to the invention.

FIGS. 3 to 6 illustrate progressive stages of assembly for the restrained mechanical joint connection. In FIG. 3, a rubber mechanical ring gasket 57 of standard design is placed on one end 58 of spacer pipe 46, and that end is then slipped into the mouth of mechanical joint bell 48. One retainer gland 12 of the pair of identical glands 11 and 12 is then slipped over the other end 59 of the spacer pipe with the circular rib 36 facing the gasket 57, T-bolts 52 are inserted through mating holes in flange 56 and flat ring portion 32, and the gland rib is drawn up to compress the gasket against the spacer pipe and the inside of the bell by screwing nuts 54 onto the threaded ends of bolts 52.

Figure 4:
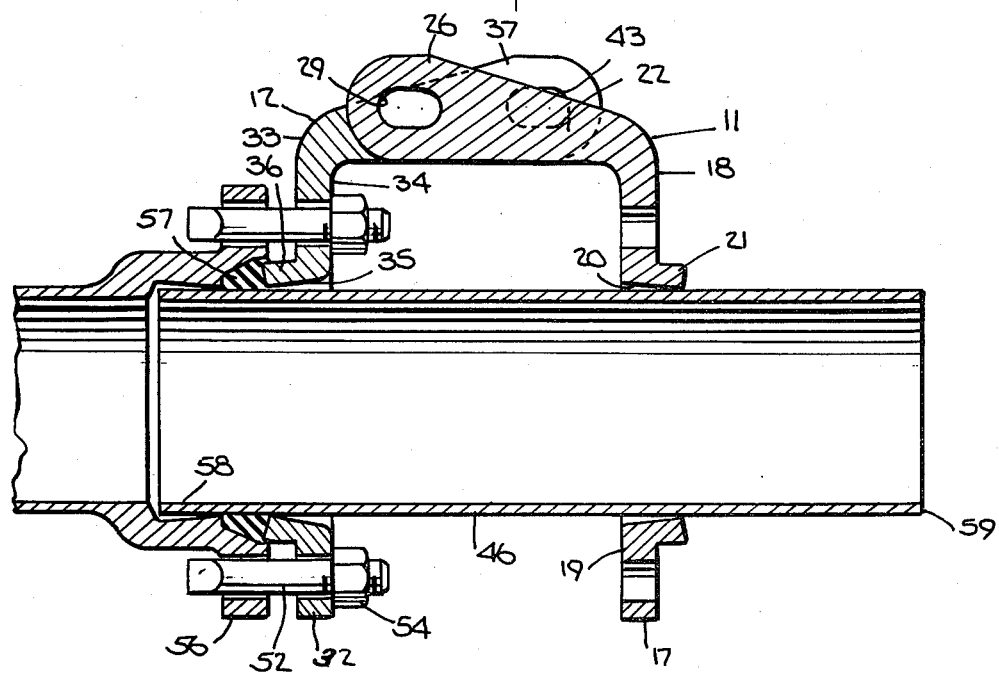

Next, the other retainer gland 11 of the pair is slipped over end 59 of the spacer pipe, with its circular rib 21 facing in the opposite direction from that of gland 12 and with its hinge arms overlapping the hinge arms of retainer gland 11, as shown in FIG. 4.

Figure 5:
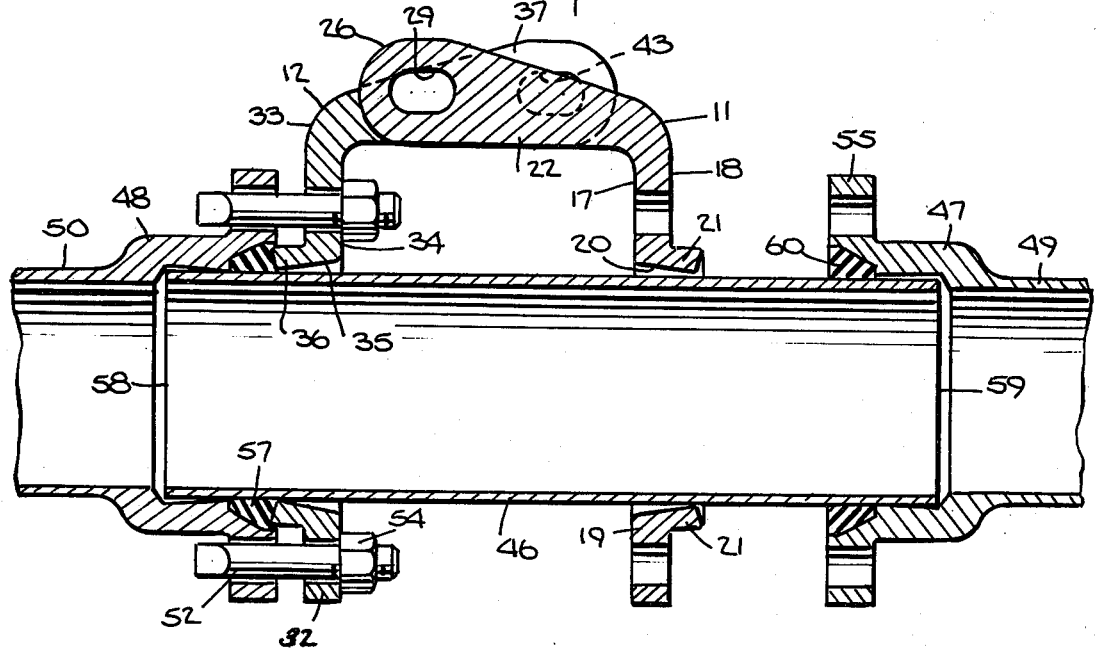
Figure 6:
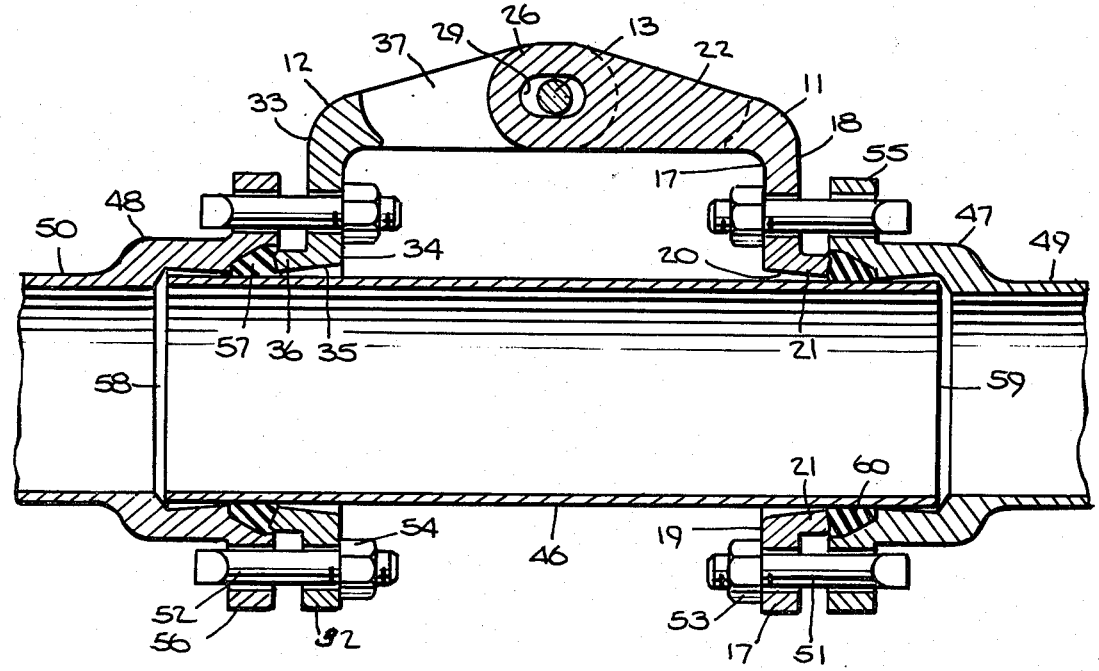

The bell end 47 of the next pipe or fitting 49 is then slipped onto end 59 of spacer pipe 46, after first placing a second gasket 60 on the spacer pipe, as shown in FIG. 5. Gland 12 is then slid back into contact with gasket 60 and bolted to its mechanical bell in the same manner as gland 12. As shown in FIG. 6, the length of spacer pipe 46 is such that when the two glands are bolted to their respective mechanical joint bells, the transverse holes in the outer end portions of their respective hinge arms are in general alignment so that hinge bolt 13 can be inserted to complete the assembly of the restrained mechanical joint connection.

It will be apparent from FIG. 6 and FIG. 2 that the assembled mechanical joint connection of the present invention permits angular misalignment of the spacer pipe with each mechanical joint bell to the design limits of the bells, not only in a vertical plane (by reason of pivoting of the hinge arms about the hinge bolt axis) but also in a horizontal plane (by reason of the play provided by the elongation of the transverse holes in the hinge arms and their tapered contact faces, shown particularly in FIG. 2).

As a result of the "hinge" placement on one side of the pipeline axis (preferably on top for easiest access) a restrained mechanical joint connection is provided which maintains full flexibility to accommodate settling subsequent to installation of the piping system.

The above-described design is readily applicable to any standard size of mechanical joint pipe, from 2-inch to 54-inch, and the retainer glands are easily and simply manufactured by adding hinge arms to standard patterns for conventional mechanical joint glands. All of the other components of the assembly are standard readily available mechanical joint fittings and accessories. Consequently, the invention solves simply and economically a long-standing problem in the art of mechanical joint piping.

I claim:

1. A retainer gland for mechanical joint pipe and mechanical joint fittings, the gland including a flat ring portion having a longitudinal axis with two substantially parallel faces perpendicular to the axis and an opening with a circular inner circumference, and a circular rib portion extending generally axially from one face of the flat ring portion adjacent said inner circumference, the flat ring portion and the circular rib portion having a generally L-shaped radial cross section, wherein the retainer gland further comprises:

at least a first hinge arm extending generally axially from the other face of the flat ring portion and terminating in an outer end portion, the first hinge arm having a transverse hole through said outer end portion, said hole being coaxial with a hinge axis which is perpendicular to a plane containing said longitudinal axis of the flat ring portion and there being no axial protrusion from said other face of the flat ring portion that does not intersect said hinge axis.

2. A retainer gland according to claim 1 wherein said first hinge arm is located entirely on one side of and has a side face contiguous to the diametral plane which is perpendicular to the common hinge axis.

3. A retainer gland according to claim 2 comprising a second hinge arm substantially congruent with said first hinge arm and having a transverse hole coaxial with the transverse hole in the first hinge arm, said second hinge arm extending from said other face of the flat ring portion in spaced relation to the first hinge arm on the other side of said diametral plane.

4. A retainer gland according to claim 3 wherein the spacing between the first and second hinge arms is slightly greater than the transverse thickness of the first hinge arm.

5. A retainer gland for mechanical joint pipe and mechanical joint fittings, the gland including a flat ring portion having two substantially parallel faces and a circular inner circumference, and a circular rib portion extending generally axially from one face of the flat ring portion adjacent said inner circumference, the flat ring portion and the circular rib portion having a generally L-shaped radial cross section, wherein the retainer gland further comprises:

a first hinge arm extending generally axially from the other face of the flat ring portion and terminating in an outer end portion, said first hinge arm having a transverse hole through said outer end portion, wherein the transverse hole through the outer end portion of the first hinge arm has a longitudinal axis which is substantially perpendicular to a diametral plane of the flat ring portion, and said first hinge arm is located on one side of and closely adjacent to said diametral plane;

a second hinge arm substantially congruent with said first hinge arm and having a transverse hole coaxial with the transverse hole in the first hinge arm, said second hinge arm extending from said other face of the flat ring portion in spaced relation to the first hinge arm on the other side of said diametral plane; and a third hinge arm substantially congruent with the first and second hinge arms and having a transverse hole coaxial with the transverse holes in the first and second hinge arms, said third hinge arm extending from said other face of the flat ring portion in spaced relation to the first hinge arm and on the same side of said diametral plane.

6. A retainer gland according to claim 5 wherein the spacing between the first and third hinge arms is slightly greater than the transverse thickness of the second hinge arm.

7. A retainer gland according to claim 5 wherein said transverse holes in the first, second, and third hinge arms are elongated in a direction substantially perpendicular to the faces of the flat ring portion.

8. A retainer gland assembly for mechanical joint pipe, the retainer gland assembly comprising:

a first gland member including a flat ring portion having a longitudinal axis with two substantially parallel faces perpendicular to the axis and an opening with a circular inner circumference, and a circular rib portion extending generally axially from one face of the flat ring portion adjacent said inner circumference, the flat ring portion and the circular portion having a generally L-shaped radial cross section, the first gland member further comprising at least a first hinge arm extending generally axially from the other face of the flat ring portion and terminating in an outer end portion, the hinge arm having a transverse hole extending through said outer end portion in a direction perpendicular to a diametral plane of the flat ring portion, said hinge arm being located on one side of and closely adjacent to said diametral plane, said hole being coaxial with a hinge axis which is perpendicular to a plane containing said longitudinal axis;

a second gland member having a flat ring portion and a circular rib portion substantially identical to the corresponding portions of the first gland member and having at least a first hinge arm extending generally axially from the flat ring portion, the hinge arm having a transverse hole extending therethrough, the second gland member being arranged with its flat ring portion substantially coaxial with and spaced from the flat ring portion of the first gland member and with its first hinge arm in lapped abutment with the first hinge arm of the first gland member; and a hinge bolt extending through the transverse holes in the hinge arms of the first and second gland members.

9. A retainer gland assembly according to claim 8 wherein the second gland member is substantially identical to the first gland member.

10. A retainer gland assembly according to claim 9 wherein the first and second gland members each comprises a second hinge arm substantially congruent with said first hinge arm and having a transverse hole coaxial with the transverse hole in the first hinge arm, said second hinge arm extending from said other face of the flat ring portion in spaced relation to the first hinge arm on the other side of said diametral plane, the first hinge arm of the second gland member being positioned in the space between the first and second hinge arms of the first gland member.

11. A retainer gland assembly according to claim 10 wherein the first and second gland members each comprises a third hinge arm substantially congruent with the first and second hinge arms and having a transverse hole coaxial with the transverse holes in the first and second hinge arms, said third hinge arm extending from said other face of the flat ring portion in spaced relation to the first hinge arm and on the same side of said diametral plane, the second hinge arm of the second gland member being positioned in the space between the first and third hinge arms of the first gland member.

* * * * *